Figure 1:
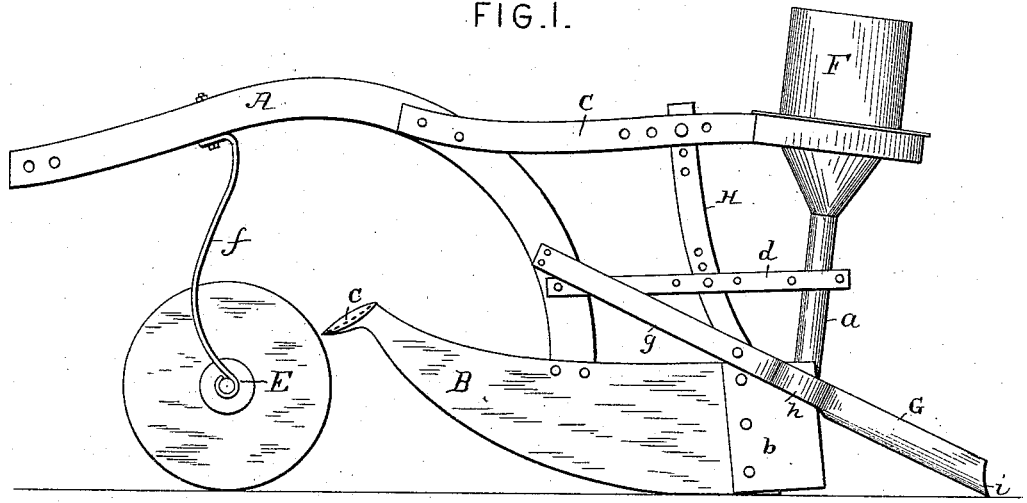

(No Model.)

J. C. WEAKLEY.
COVERER FOR SEEDING MACHINES.

No. 372,190. Patented Oct. 25, 1887.

ATTEST- INVENTOR-
Harry L. Arner John C. Weakley
Chas. W. Merle per O. E. Duffy
 att'y

UNITED STATES PATENT OFFICE.

JOHN C. WEAKLEY, OF SLATE, KANSAS.

COVERER FOR SEEDING-MACHINES.

SPECIFICATION forming part of Letters Patent No. 372,190, dated October 25, 1887.

Application filed June 6, 1887. Serial No. 240,345. (No model.)

*To all whom it may concern:*

Be it known that I, JOHN C. WEAKLEY, of Slate P. O., in the county of Rooks and State of Kansas, have invented certain new and useful Improvements in Coverers for Seeding-Machines; and I do hereby declare that the following is a full, clear, and exact description of the invention, which will enable others skilled in the art to which it appertains to make and use the same, reference being had to the accompanying drawings, and to the letters of reference marked thereon, which form part of this specification.

The object of my invention is to produce a simple, effective, and reliable attachment for listing-plows and seeding-machines for agricultural purposes which is cheap in first cost, easily applied, and not likely to get out of repair.

Heretofore seed-coverers have been made to gather the soil over the furrow in a loose manner, leaving the soil open and spongy, whereby the little grain-eating animals—such as ground-squirrels, birds, and the like—readily find the grain and eat it, thus destroying whole fields, as is well known to farmers. It is also well known that grain has to be closely covered and the soil well compressed around it in order to make it germinate and to prevent the air from drying the soil and extracting the moisture therefrom and from the rootlets of the grain before they have time to take hold and spread, and for this purpose rollers have to be used to roll and compress the ground after the coverer. With my device the roller is dispensed with, and instead of flattening the ground, as with the roller, I cut water-holding trenches each side of the furrows, as will be hereinafter more fully explained.

My invention consists in means for cutting sod of fresh ground and opening furrows therein for the reception of grain, in combination with seed drills or feeders and means for covering up and closing said furrows after the grain has been deposited, and at the same time compressing it, whereby the soil is closely packed over the furrow, as would be the case if a roller was run over it, except that in my method I not only compress the soil over the grain, but I also form on each side of the ridge or furrow small trenches for the reception of water and for holding the moisture for the benefit of sprouting and germinating the grain and maintaining it in a healthy condition.

The means I employ are as follows: For example, I take an ordinary seed-drill or listing-plow, either walking, riding, rotary, or other automatically-operated seeding-machine, and I attach to the beam thereof, in rear of the plowshare, my covering, cutting, and compressing knives at such an incline and angle as to cause them at their rear ends to form an angle somewhat the shape of an inverted V—thus ∧—in cross-section, the said V-shaped portion extending from a point beyond the spout of the feed-hopper and to the ground. The other ends of the knives have bolt-holes in them, by which they are preferably secured to the beam, and at or near their middle portion they are in turn secured to a brace, which brace is adjustably secured to the brace carrying the seed-hopper, and which permits a yielding motion, whereby the knives may pass over irregularities of the ground without injury, and the brace at the same time stiffens the knives sufficiently to enable them to cover the furrows with the sod or soil and compress it, also forming trenches each side of the furrow. These knives are adjusted to an angle sufficient to gradually spread over the drill or furrow made by the plow point or cutter, and then penetrate the soil so as to cover and form a trough for the reception of the water in the manner before mentioned. These knives are straight and run parallel for a portion of their length, where their attachments are made, and then bent or flared to pass around the seed-spout, and then twisted to form the angle or inverted-V shape, as shown.

It is obvious that the usual lifting and adjusting levers may be employed where my device is used with riding-machines. These knives are made of spring-tempered steel and will yield to obstruction passing between them without injury.

My device or improved coverer is principally designed for sod land, but will act well with any kind of land or any kind of listing-plows and seeding-machines.

My invention further consists in the combination, with my sod-cutter, of a removable listing-point or plowshare, they being arranged in such manner that when the plow-share and listing-point are used the sod-cutter becomes a subsoiler, so that I produce a lister subsoiler seeder and coverer in the same machine, only, however, claiming my particular devices.

Figure 2:
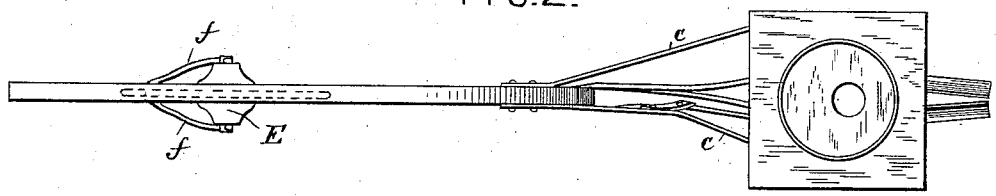
Figure 6:
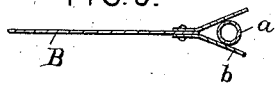
Figure 3:
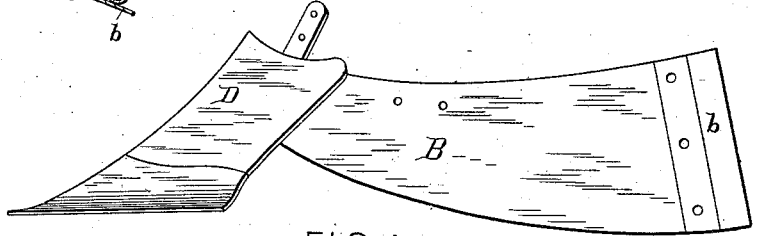
Figure 4:
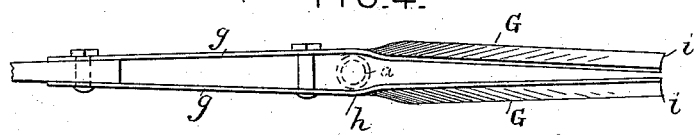
Figure 5:
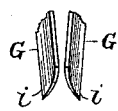

In the drawings hereto annexed, Figure 1 shows a side elevation of my device attached to a seeding-machine; Fig. 2, a top plan view of the same. Fig. 3 illustrates the cutter converted to a subsoiler, to which is attached a listing or other plow point. Fig. 4 shows a top plan view of the coverer and knives which form the gist of my invention. Fig. 5 shows a top and end view of the same. Fig. 6 shows a broken section of the sod-cutter at its rear end, having plowshares or mold-boards for opening the sod at the point where the grain drops into the furrow and between which the grain spout is located.

A is the beam of a plow, and B the sod-cutter provided with a shoe, C, on its front end for the reception of the plow-point D or other attachment for such uses.

E is also a colter sod-cutter.

F is the seed-box or hopper, and $a$ its spout extending down between the mold-boards $b$.

$c\ d$ are braces for supporting the grain-hopper, and $f$ are brackets for carrying the rotary sod-cutter.

G G are my improved covering-knives, which are nearly parallel for a portion of their length, as at $g$, and are slightly rounded at $h$ to partially encircle the said spout passing between them. (See Fig. 1, and at $h$, Fig. 4.) The knives are then twisted to an angle to give them a flaring under surface to such an extent as to straddle or overlap the furrow, whereby the soil is gathered over it, and the flat sides, nearly meeting at the top, compress the soil over said furrow. The portion of the knives, as at $i\ i$, Figs. 4 and 5, cut into the ground, forming trenches for moisture to gather therein for the sustenance of the grain.

Extending upwardly from the knives G is a brace, H, which is connected to the brace $c$ of the hopper, and which may be adjusted vertically for the purpose of raising and lowering the covering-knives as required. The main object of the brace H, however, is to stiffen the knives and keep them down to compress the soil over the furrow and to cut the trenches each side of it.

It will be observed that the coverers G are knife-edged and are, preferably, of spring-steel, so that they may glide over any irregularities of the ground or other obstacle getting between and under them and again resume their normal position.

In operation the sod-cutters E and B cut the sod, the mold-boards $b\ b$ open the furrows, the grain drops down into the furrow behind and between the mold-boards, and the spring-knives cover and compress the sod or soil over the furrow, cutting trenches outside of it, the cutter B, at its rear end, cutting a subsoil trench in the bottom of the furrow, which opens the soil deeper for the benefit of the grain. The same operation takes place in old soil, where the plow point or share is used, only the plowshare or lister takes the place of the sod-cutter.

It is obvious that my spring cutting, covering, and compressing knives may be applied to any kind of seeding-machines. It is also evident that the contour of the knives may be changed without departing from the spirit of my invention, although I prefer the form shown.

It is also obvious that this device may be employed for fertilizing purposes.

What I claim as new, and desire to secure by Letters Patent, is—

1. In a listing-plow provided with seed-planting mechanism, the coverers G G, formed as described and provided with knife-edges, substantially as shown.

2. A grain-coverer for plows, consisting of the bars G G, having knife-edges and adapted to overlap and compress the soil of a furrow and cut trenches each side thereof, substantially as described.

3. The combination, with a plow and grain-planting mechanism, of the cutter B, provided with mold-boards arranged as described, and the knife-shaped coverers and compressors, adapted to operate substantially as set forth.

4. The combination, with a plow, of the sod-cutter and furrow coverer and compressor, the latter having knife-edges, for the purpose herein set forth.

5. The combination of a plow, the spring-coverer having knife-edges, and the brace H, substantially as set forth.

6. The combination of the plow, the sod-cutter provided with mold-board, the spout $a$, the cutting, covering, and compressing knives G, and the braces H, $c$, and $d$, substantially as set forth.

7. As a new article of manufacture, the spring covering, cutting, and compressing bar provided with knife-edges and twisted in the form shown, for the purpose set forth.

In testimony that I claim the foregoing as my own I affix my signature in presence of two witnesses.

JOHN C. WEAKLEY.

Witnesses:
O. E. DUFFY,
CHARLES M. WERLE.